United States Patent [19]

Mueller

[11] Patent Number: 5,009,599
[45] Date of Patent: Apr. 23, 1991

[54] SCULPTURE APPARATUS

[76] Inventor: Timothy T. Mueller, 96 Eagle Point, Irvine, Calif. 92714

[21] Appl. No.: 451,601

[22] Filed: Dec. 18, 1989

[51] Int. Cl.⁵ .............................................. G09B 11/00
[52] U.S. Cl. ........................................ 434/81; 434/82; 446/111; 446/112; 446/122; 446/123
[58] Field of Search .................... 434/81, 82, 171, 172, 434/160; 446/85, 108, 111, 112, 122, 123; 52/126, 585; 273/156, 160

[56] References Cited

U.S. PATENT DOCUMENTS

| 144,124 | 10/1873 | Oberndorf | 446/122 |
| D. 174,951 | 6/1955 | Frishberg | 446/111 X |
| 1,695,553 | 12/1928 | Jones et al. | 446/122 X |
| 3,224,136 | 12/1965 | Moryl | 446/126 X |
| 3,689,075 | 9/1972 | Adelsohn | 446/85 X |
| 3,690,656 | 9/1972 | Hughes et al. | 446/85 X |
| 4,571,200 | 2/1986 | Serna | 446/85 |

FOREIGN PATENT DOCUMENTS

| 1088092 | 3/1955 | France | 446/121 |
| 2108857 | 5/1983 | United Kingdom | 446/126 |

Primary Examiner—Robert Bahr
Attorney, Agent, or Firm—Leon Gilden

[57] ABSTRACT

An apparatus is set forth for the aesthetic assemblage of components including plate members and elongate rods. The plate members include parallel, orthogonal, and angulated side surfaces in containing various apertures therethrough including orthogonally extending apertures relative to the upper and lower surfaces of each plate, angulated apertures oriented non-orthogonally to the upper and lower surfaces of each plate, and blind bores formed in a non-through-extending manner relative to the plates for receiving the respective rods to assemble the various plates and rods in a creative assemblage for educational and creative development of individuals.

7 Claims, 4 Drawing Sheets

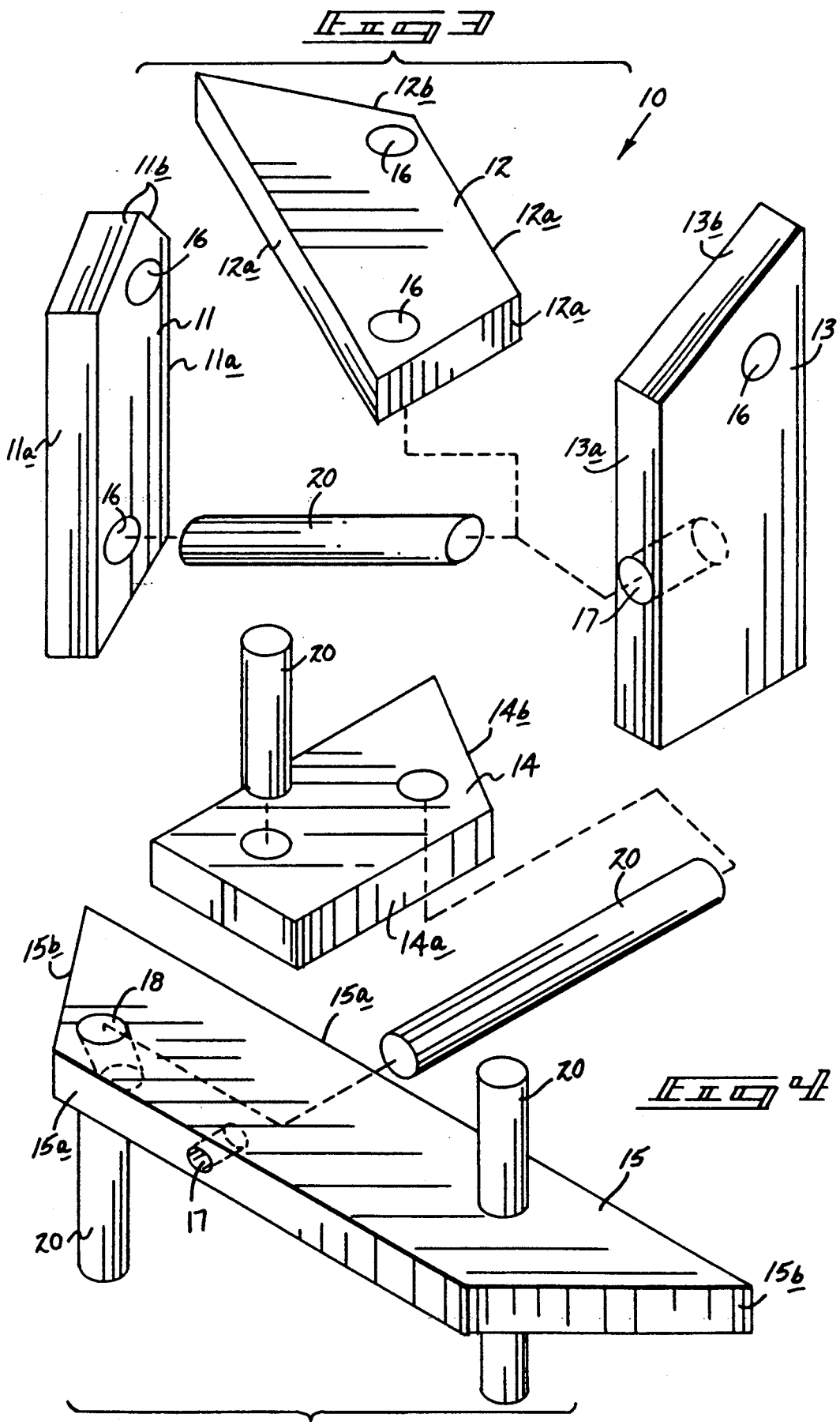

SCULPTURE APPARATUS

BACKGROUND OF THE INVENTION

1. Field of the Invention

The field of invention relates to sculpturing and educational apparatus wherein the same includes plates and rods of various configurations assembled together in a predetermined manner to create various sculptural devices.

2. Description of the Prior Art

Apparatus is available in the prior art to effect sculpturing of various configurations and desired geometric orientation of associated structural components to effect a composite based on an individual's imagination and creativity. Developmental sculpturing apparatus of the prior art, however, has heretofore failed to enable the infinite creativity and aesthetic appeal of the contrasting organizational components, as utilized by the instant invention. Examples of the prior art include U.S. Pat. No. 4,674,981 to LaPadura wherein a support stand is provided for the securement of wires bent in a predetermined organization to provide a skeletal support base for modeling clay and the like.

U.S Pat. No. 3,503,832 to Umminger sets forth a sculpturing apparatus utilizing a base with an orthogonally oriented central peg member for receiving a stack of plates thereon rotatable relative to the peg to create a variety of sculptured figures.

U S. Pat. No. 8,089,219 to Umstead sets forth a collapsible lawn mobile wherein the parts respectively simulate the head and body of a bird, each formed of sheet material for construction of the erected organization.

U.S. Pat. No. 4,430,825 to Leboeuf provides an educational type toy wherein a three-dimensional organization of numerical digital figures are associated in a representation of a human head.

U.S. Pat. No. 3,339,294 to Byrnes provides an educational toy formed of plate members with various relief portions cut therein for interlocking engagement with associated plate members to create an erected structure.

As such, it may be appreciated that there is a continuing need for a new and improved sculpture apparatus to provide an educational form for the development of imagination and creativity in the construction of sculpture which addresses both the problems of ease of use and effectiveness in organization and in this respect, the present invention substantially fulfills this need.

SUMMARY OF THE INVENTION

In view of the foregoing disadvantages inherent in the known types of sculptural apparatus now present in the prior art, the present invention provides a sculpture apparatus wherein the same utilizes geometric plates and cylindrical peg of various geometric configurations to enable securement of the pegs and placed together in a final erected form. As such, the general purpose of the present invention, which will be described subsequently in greater detail, is to provide a new and improved sculpture apparatus which has all the advantages of the prior art sculptural apparatus and none of the disadvantages.

To attain this, the present invention includes a series of pegs of parallel upper and lower planar sides with the plates including parallel sides secured together by an orthogonal side and further including acutely oriented angular sides to enable creation of random geometric sculptural configurations. The plates include apertures of various types including through-extending orthogonal apertures relative to the upper and lower surfaces of each plate, blind bores directed through the sides, and upper and lower surfaces of each plate, and angulated sides oriented at relative acute angles to an upper and lower surface of each side wherein the rods are of cylindrical and angular configurations, and further include selectively threaded end portions and star shaped end portions for pre-selected registration and orientation of the pegs relative to the plates.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims nor is it intended to be limiting as to the scope of the invention in any way.

It is therefore an object of the present invention to provide a new and improved sculpture apparatus which has all the advantages of the prior art sculpture apparatus and none of the disadvantages.

It is another object of the present invention to provide a new and improved sculpture apparatus which may be easily and efficiently manufactured and marketed.

It is a further object of the present invention to provide a new and improved sculpture apparatus which is of a durable and reliable construction.

An even further object of the present invention is to provide a new and improved sculpture apparatus which is susceptible of a low cost of manufacture with regard to both materials and labor, and which accordingly is then susceptible of low prices of sale to the consuming public, thereby making such sculpture apparatus economically available to the buying public.

Still yet another object of the present invention is to provide a new and improved sculpture apparatus which provides in the apparatuses and methods of the prior art some of the advantages thereof, while simultaneously overcoming some of the disadvantages normally associated therewith.

Still another object of the present invention is to provide a new and improved sculpture apparatus wherein the same utilizes plates and pegs of various geometric configurations to enable erection of various sculptural configurations.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of a first series of plates and a peg of the instant invention.

FIG. 4 is an isometric illustration of a further series of plates and pegs utilized by the instant invention.

DESCRIPTION OF THE PREFERRED EMBODIMENT

Figure 1:
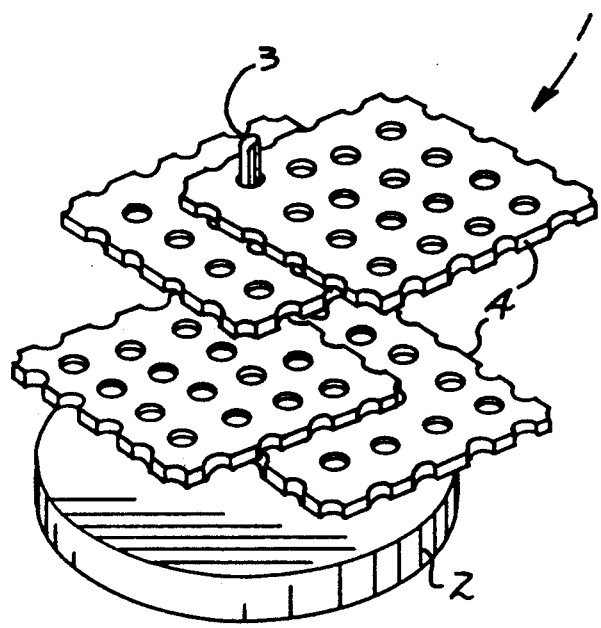
FIG. 1 is an isometric illustration of a prior art sculptural apparatus.

With reference now to the drawings, and in particular to FIGS. 1 to 10 thereof, a new and improved sculpture apparatus embodying the principles and concepts of the present invention and generally designated by the reference numeral 10 will be described.

Figure 2:
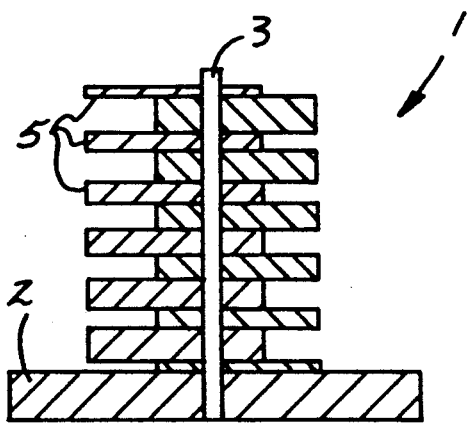
FIG. 2 is an orthographic view taken in elevation of a prior art sculpture apparatus.

FIGS. 1 and 2 are illustrative of prior art examples illustrating sculpture apparatus 1 formed with a base member 2 and a peg member 8 extending orthogonally relative to the base member. The peg member rotatably receives perforated plates 4 rotatably mounted relative to the peg member and base 2 to effect various sculptural configurations. FIG. 2 is illustrative of plate members 5 of various thicknesses that may also be rotatably mounted relative to the peg member 3.

Figure 5:
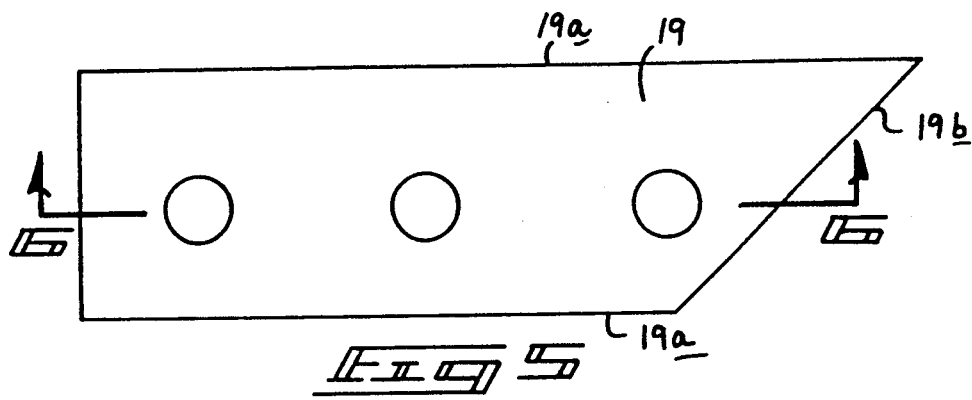
FIG. 5 is a top orthographic view of a sculpture plate utilized by the instant invention.
Figure 6:
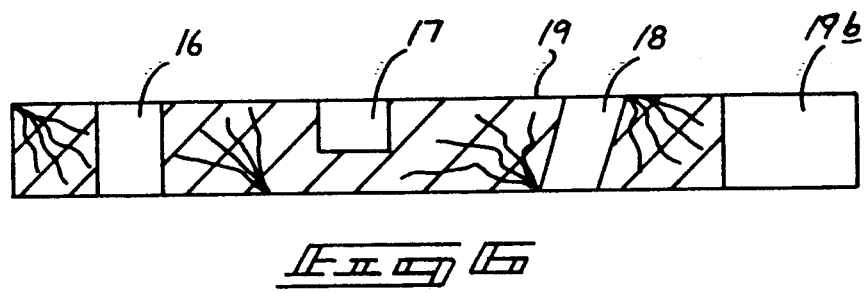
FIG. 6 is an orthographic cross-sectional view taken along the lines 6—6 of FIG. 5 in the direction indicated by the arrows.

The sculptural apparatus 10 as set forth by the instant invention, is illustrated in FIG. 3 for example and includes a first, second, third, fourth, and fifth sculptural plate member 11, 12, 13, 14, and 15. The first sculptural plate member 11 for example may include parallel sides 11a joined at one end by an orthogonally oriented side and at their other end by further sides 11b oriented at acute angles relative to the parallel sides 11a. Similarly, the sculpture plate members 12 through 15 respectively, each include at least one side oriented at an acute angle relative to adjoining sides, e.g. sides 12b relative to sides 12a, side 13b relative to sides 13a, and sides 15b relative to sides 15a, as illustrated in FIGS. 3 and 4. The plate members are provided with a random variety of apertures including through-extending apertures 16 that are oriented orthogonally relative to upper and lower parallel planar surfaces of each of the sculpture plate members and further include partially extending blind bores 17 that are positioned a limited distance through the top and bottom surfaces or through side walls of the each of the plate members, and may further include diagonally extending apertures 18 that are oriented at an acute angle relative to the upper and lower surfaces or sides of each of the plate members. The various apertures are of a predetermined cylindrical configuration for reception of cylindrical rods 20 therewithin. The cylindrical rods 20 are provided in various lengths to effect association of the sculpture plates in a pattern limited only by the imagination and creativity of an individual directed in the utilization of the invention. FIGS. 5 and 6 ar illustrative of a sixth plate member 19 formed with parallel sides 19a and an angulated side 19b wherein the sixth sculpture plate member 19 is provided with an exemplary array of through-extending apertures 16, blind bore 17, and a diagonally extending aperture 18.

Figure 7:
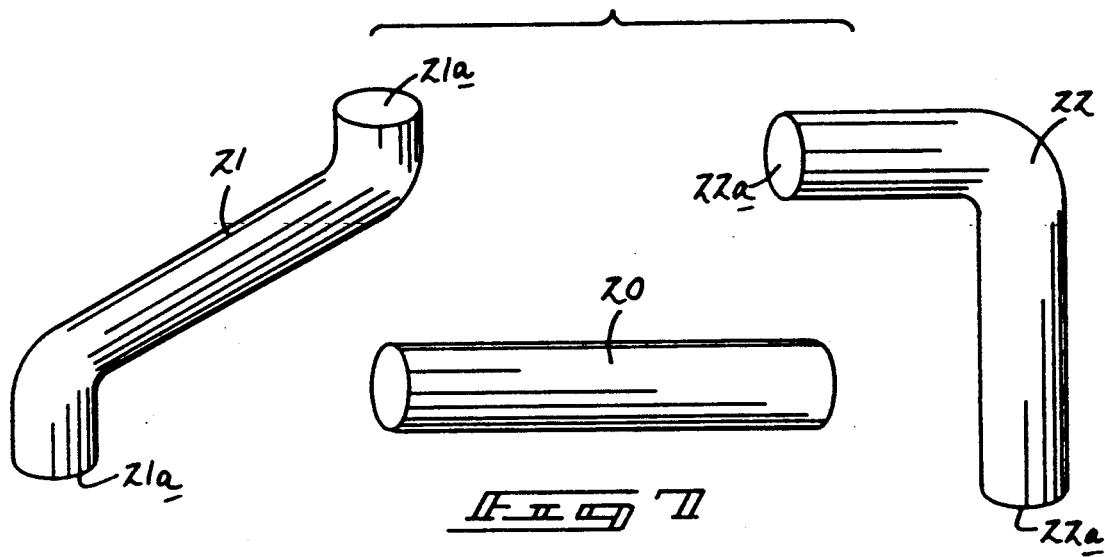
FIG. 7 is an isometric illustration of a further series of cylindrical pegs or rods utilized by the instant invention.

FIG. 7 is illustrative of assembly rods utilized by the instant invention. It should also be noted the assembly rods may either be formed of a wooden, polymeric, or contrasting steel material for assemblage of the sculpture plate members. Angulated rods 21 are utilized formed with axially parallel and offset cylindrical end portions 21a. It should be noted that the end portions 21a are of a length at least equal to a predetermined width of each of the sculpture plate members, and further the sculpture plate members are of an equal predetermined width. Angular rod 22 is formed with diverging end portions 22a that are of cylindrical configuration, wherein their axes are oriented relative to one another at various angles other than 180 degrees to provide a further creativity rod to enhance the imagination of individuals utilizing the invention. Further, it should also be noted that the ends 22a are also of a length at least equal to or greater than the predetermined width of each of the plate members.

Figure 8:
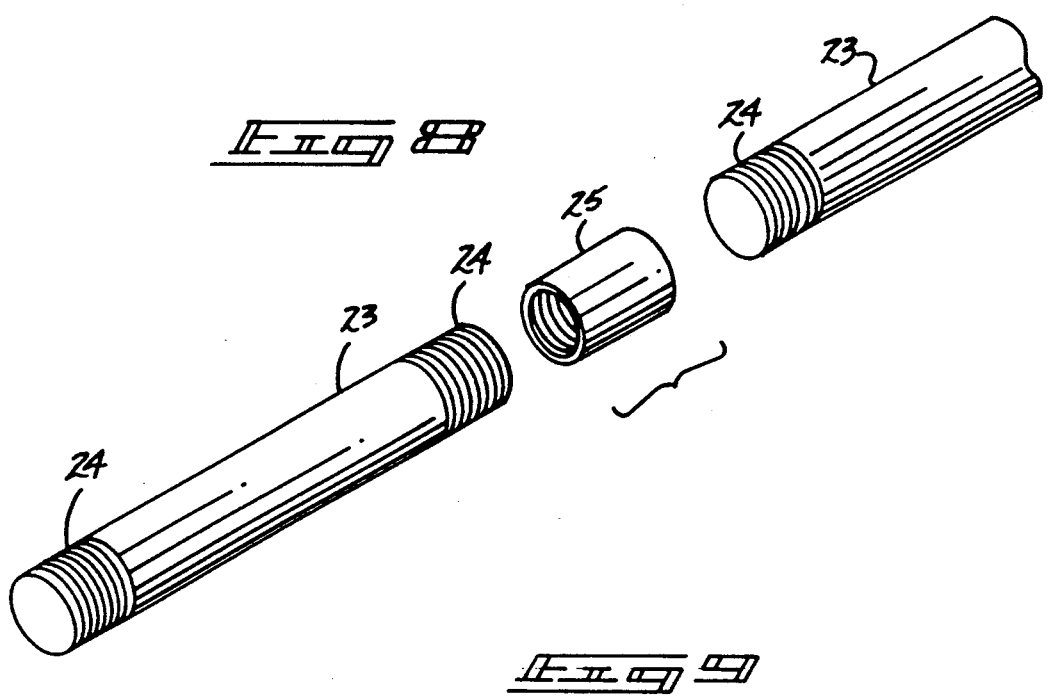
FIG. 8 is an isometric illustration of a further rod utilized by the instant invention.

FIG. 8 is illustrative of joining rods 23 formed with threaded end portions 24 that are threadedly receivable within sculpture plate members formed with complimentarily threaded bores in lieu of smooth apertures. The threaded end portions 24 may also be secured together by internally threaded sleeves 25, as illustrated in FIG. 8, to provide joining rods 23 of any length as desired.

Figure 9:
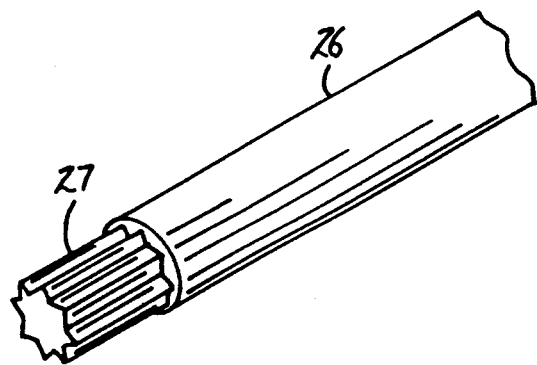
FIG. 9 is an isometric illustration of a still further rod utilized by the instant invention.
Figure 10:
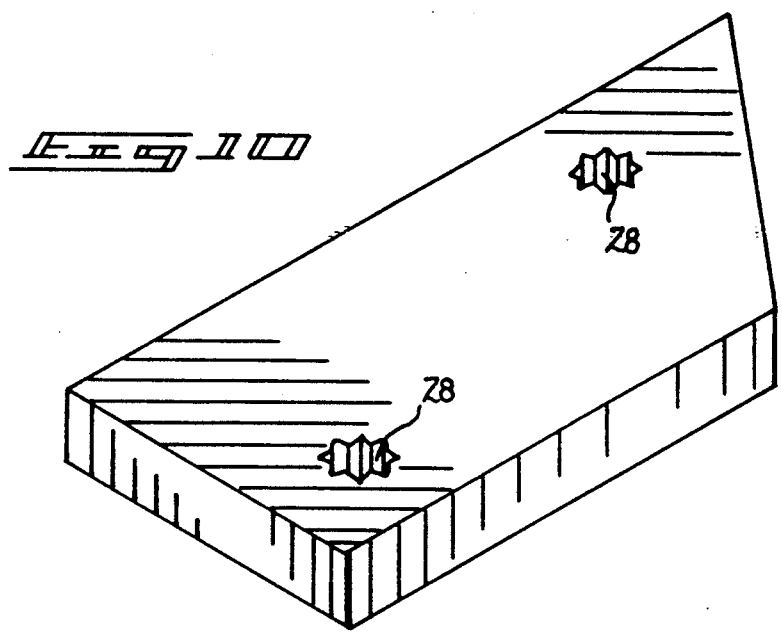
FIG. 10 is an isometric illustration of a sculpture plate utilized by the rod, as illustrated in FIG. 9.

FIG. 9 is illustrative of a positioning rod 26 that is utilized by the instant invention formed with a star shaped end 27. The star shaped end 27 is also of a length at least equal to or greater than the predetermined width of each of the sculpture plate members, as is the threaded end portions 25, wherein the star shaped ends 27 are receivable within complimentarily shaped star apertures 28 formed within a surface of a sculpture plate member, as illustrated in FIG. 10 for example.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An educational sculpture apparatus comprising, in combination,
   a plurality of plate members, each plate member including a planar top surface overlying and coextensive with a planar bottom surface, and further including at least two parallel sides and two non-parallel sides,
   a plurality of rods including end portions, and each plate member including a plurality of bores for receiving the rod end portions for forming an erected educational sculpture, and
   wherein each of the plate members is of a varying geometric configuration relative to other plate members, and each plate member is of an equal predetermined thickness, and
   the plate members include a predetermined plurality of plate members, including bores in a parallel and non-parallel relationship relative to each other, wherein the plurality of bores includes bores oriented orthogonally relative to the top and bottom surfaces, and the plurality of bores include blind bores positioned in a non-through-extending relationship relative to the plate member, and the plurality of bores include angular bores oriented at a non-orthogonal inclination relative to the top and bottom planar surfaces of an associated plate member.

2. An educational sculpture apparatus as set forth in claim 1 wherein the rod ends are of a complementary cylindrical configuration relative to each bore, and each rod end is of a length at least equal to the predetermined thickness of each plate member.

3. An educational sculpture apparatus as set forth in claim 2 wherein the rod ends are coaxially aligned relative to one another.

4. An educational sculpture apparatus as set forth in claim 3 including further rods wherein the rod ends are axially displaced relative to one another.

5. An educational sculpture apparatus as set forth in claim 4 wherein the rod ends are defined by axially diverging axes.

6. An educational sculpture apparatus as set forth in claim 5 wherein the rod ends are defined by threaded end portions receivable within complementary threaded bores within the plate members, and further including an internally threaded sleeve for securement of a plurality of rods together.

7. An educational sculpture apparatus as set forth in claim 6 including registration rods, wherein each registration rod includes a star shaped rod end, each star shaped rod end is of a length substantially equal to that defined by the predetermined thickness and each star shaped rod end is receivable within a star shaped aperture to orient each associated rod end in a predetermined angular relationship relative to a plate member.

* * * * *